(12) United States Patent
Craninckx et al.

(10) Patent No.: US 9,832,051 B2
(45) Date of Patent: Nov. 28, 2017

(54) FRONT-END SYSTEM FOR A RADIO DEVICE

(71) Applicants: IMEC VZW, Leuven (BE); Vrije Universiteit Brussel, Brussels (BE)

(72) Inventors: Jan Craninckx, Eindhoven (NL); Mark Ingels, Boutersem (BE); Pedro Emiliano Paro Filho, Campinas (BR)

(73) Assignees: IMEC VZW, Leuven (BE); Vrije Universiteit Brussel, Brussels (BE)

( * ) Notice: Subject to any disclaimer, the term of this patent is extended or adjusted under 35 U.S.C. 154(b) by 0 days.

(21) Appl. No.: 15/043,768

(22) Filed: Feb. 15, 2016

(65) Prior Publication Data
US 2016/0241424 A1    Aug. 18, 2016

(30) Foreign Application Priority Data

Feb. 16, 2015   (EP) .................................... 15155235

(51) Int. Cl.
| | | |
|---|---|---|
| *H04L 27/00* | (2006.01) | |
| *H04B 1/04* | (2006.01) | |
| *H04B 1/18* | (2006.01) | |

(52) U.S. Cl.
CPC ....... *H04L 27/0002* (2013.01); *H04B 1/0475* (2013.01); *H04B 1/0483* (2013.01); *H04B 1/18* (2013.01); *H04B 2001/0491* (2013.01)

(58) Field of Classification Search
CPC .. H04B 1/0014; H04B 1/0039; H04B 1/0483; H04L 27/0008; H04L 27/04; H04L 27/362; H04L 27/20; H04L 27/36; H04L 27/361; H04L 27/0002

USPC .................................................. 375/295–297
See application file for complete search history.

(56) References Cited

U.S. PATENT DOCUMENTS

| | | | | |
|---|---|---|---|---|
| 5,040,242 | A * | 8/1991 | Tsuchiya .............. | H04B 10/808 398/116 |
| 6,778,117 | B1 * | 8/2004 | Johnson ................. | H03C 3/403 341/118 |
| 7,012,470 | B2 * | 3/2006 | Suzuki ................. | H03C 3/0958 331/16 |
| 7,358,885 | B2 * | 4/2008 | Maxim .................. | H03C 3/403 341/136 |

(Continued)

OTHER PUBLICATIONS

He, Xin et al., "A Low-Power, Low-EVM, SAW-Less WCDMA Transmitter Using Direct Quadrature Voltage Modulation", IEEE Journal of Solid-State Circuits, vol. 44, No. 12, Dec. 2009, pp. 3448-3458.

(Continued)

*Primary Examiner* — Emmanuel Bayard
(74) *Attorney, Agent, or Firm* — McDonnell Boehnen Hulbert & Berghoff LLP

(57) ABSTRACT

The present disclosure relates to a front-end system for a radio device comprising: a charge generator circuit arranged for receiving a digital baseband signal, a first converter circuit arranged for calculating at least one charge value based on the digital baseband signal, a second converter circuit arranged for converting the at least one charge value into at least one electrical charge, and a modulator circuit arranged for generating a radio frequency signal based on the at least one electrical charge and at least one local oscillator signal.

13 Claims, 5 Drawing Sheets

(56) References Cited

U.S. PATENT DOCUMENTS

| | | | | |
|---|---|---|---|---|
| 7,439,893 B2* | 10/2008 | Inukai | H03F 3/2175 | 341/143 |
| 7,557,551 B1* | 7/2009 | Somerville | H04B 1/0483 | 323/282 |
| 7,570,923 B2* | 8/2009 | Kiss | H04B 17/21 | 455/115.1 |
| 7,657,236 B2* | 2/2010 | Pan | H04B 1/30 | 375/296 |
| 7,675,996 B2* | 3/2010 | Johnson | H03D 7/00 | 375/316 |
| 8,185,067 B2* | 5/2012 | Mattisson | H03C 3/40 | 330/10 |
| 8,319,569 B2* | 11/2012 | Kojima | H04L 27/362 | 332/103 |
| 8,380,157 B2* | 2/2013 | Zhang | H03D 7/1441 | 330/288 |
| 8,526,905 B2* | 9/2013 | Oliaei | H03D 7/1441 | 327/65 |
| 8,564,285 B2* | 10/2013 | Romero | G01R 33/07 | 324/251 |
| 8,588,712 B2* | 11/2013 | Mattisson | H03C 3/40 | 330/10 |
| 8,655,177 B2* | 2/2014 | Lowery | H04B 10/25759 | 398/115 |
| 8,768,174 B2* | 7/2014 | Zeng | H04B 10/548 | 398/183 |
| 9,000,842 B2* | 4/2015 | Aoki | H03G 1/00 | 330/124 R |
| 9,054,762 B2* | 6/2015 | Mirzaei | H04B 7/0682 | |
| 9,191,116 B2* | 11/2015 | Cho | H04B 10/548 | |
| 9,473,258 B2* | 10/2016 | Pearse | G01S 19/03 | |
| 2004/0047429 A1* | 3/2004 | Hsu | H03C 1/02 | 375/295 |
| 2005/0145773 A1* | 7/2005 | Hashimoto | G01S 7/493 | 250/203.6 |
| 2008/0279559 A1* | 11/2008 | Yu | H04B 10/25758 | 398/118 |
| 2010/0066442 A1* | 3/2010 | Mu | H03H 11/1291 | 327/553 |
| 2011/0051843 A1* | 3/2011 | Otsuka | H04B 1/30 | 375/296 |
| 2014/0167824 A1* | 6/2014 | Nakamoto | H03M 1/12 | 327/143 |
| 2015/0304049 A1* | 10/2015 | Huang | H04B 10/5165 | 398/115 |
| 2015/0349733 A1* | 12/2015 | Chen | H03F 3/45479 | 330/258 |
| 2016/0047916 A1* | 2/2016 | Pearse | G01S 19/21 | 342/357.59 |

OTHER PUBLICATIONS

Yoo, Sang-Min et al., "A Class-G Switched-Capacitor RF Power Amplifier", IEEE Journal of Solid-State Circuits, vol. 48, No. 5, May 2013, pp. 1212-1224.

* cited by examiner

FRONT-END SYSTEM FOR A RADIO DEVICE

CROSS-REFERENCE TO RELATED APPLICATIONS

The present application is a non-provisional patent application claiming priority to European Patent Application No. EP 15155235.3 filed Feb. 16, 2015, the contents of which are hereby incorporated by reference.

FIELD OF THE DISCLOSURE

The present disclosure relates to radio devices and more specifically to a front-end system for a radio device.

BACKGROUND

Radio devices for high-performance wireless systems may be built around a Gilbert-mixer architecture. A Gilbert-mixer is a frequency-translating circuit where the baseband (BB) signal is converted into a current, which current is then switched periodically by transistor switches in accordance with a local oscillator signal onto a radio-frequency (RF) load. However, radio transmitters based on such architectures (e.g., SAW-less radio transmitters) have a fundamental problem with out-of-band noise when operating in Frequency Division Duplex (FDD) mode which affects severely the operation of the radio receiver. Therefore, the noise generated by a radio transmitter in the frequency band of the receiver must be extremely low.

A high output noise in the frequency-band of the receiver in such Gilbert-mixer based radio architectures is mainly due to the modulated baseband noise. The baseband current in such mixer does not only carry the useful signal, but also higher-frequency noise components that may be difficult to filter out. A low-pass filter is thus needed, but such filter cannot be realized in the current-domain without using inductors, which are bulky and expensive. Therefore, a low-noise radio transmitter design is required.

Conventionally in transmitter devices, a low noise level (for example, a noise level of −183 dBm/Hz) is achieved by sufficient filtering in both the duplexer (for example, 50 dB) and in the Surface Acoustic Wave (SAW) filter of the transmitter. The SAW filter in the transmitter, however, limits the operation across multiple bands and is not tolerated anymore in a modern cost-effective solution. Therefore, the transmitter device itself must achieve a low out-of-band noise level in the order of −160 dBm/Hz.

Xin He, et. al. proposes in "A Low-Power, Low-EVM, SAW-Less WCDMA Transmitter Using Direct Quadrature Voltage Modulation," IEEE Journal of Solid-State Circuits, vol. 44, no. 12, pp. 3448-3458, December 2009, an alternative transmitter architecture based on baseband voltage sampling instead of current switching. In this architecture, the four (quadrature and differential) baseband voltages are sampled consecutively onto the RF output capacitance with a 25% duty-cycled LO signal to effectively perform a frequency upconversion. The technique is similar to a passive mixer combined with a passive RC pole in the baseband chain to filter out out-of-band baseband noise before upconversion takes place. However, this architecture requires buffer circuits to drive the baseband inputs of the mixer. The buffer circuits thus need to drive rather low impedance levels (order of magnitude for R and C are 100 ohm and 100 pF), with a very large signal swing (to achieve sufficient signal-to-noise ratio) and with very stringent linearity requirements. In addition, as this implementation is very analog-intensive, it becomes more and more difficult to be implemented in newer-generation digital CMOS technologies.

Alternative radio transmitters were proposed employing a Direct Digital RF Modulator (DDRM). DDRM is based on a technique that merges a digital-to-analog converter (DAC) with an upconverter (mixer) in one single block to realize a radio frequency DAC (RFDAC). As such, however, there is no baseband signal in the analog domain. Thus, the traditional reconstruction filter after digital to analog conversion that typically attenuates the quantization noise and removes the aliases (i.e. the replicas of the digital signal around the sampling frequency and its harmonics) cannot be used. To offer sufficient filtering, high oversampling ratios (OSR) must be used to move these aliases to far-away locations and to exploit the filtering effect of the DAC $\sin(x)/x$ (sin c) response. DDRM-based radio architectures can achieve a good in-band signal quality, but fail to achieve a sufficiently low out-of-band noise level. Moreover, both the in-band and the out-of-band noise level can rise above the levels required by the telecommunication specifications, and especially for cellular systems.

Yoo et. al. disclose in "A Class-G Switched-Capacitor RF Power Amplifier," IEEE Journal of Solid-State Circuits, Vol. 48, No. 5, pp. 1212-1224, May 2013, an alternative technique based on a switched-capacitor power amplifier (SCPA). The SCPA consists on an array of capacitors, a number of which (determined by the desired output amplitude) are switched at RF frequency between supply voltage and ground, thus generating an RF waveform. This system is capable of generating an RF output of reasonable accuracy, but generates a large amount of output noise both in the adjacent and far-out channels, which make it unusable in a practical system.

There is thus a need for novel transmitter architectures that are more digital-intensive and power efficient, that can be implemented in a nanoscale CMOS process using a small area.

SUMMARY

The present disclosure includes a novel digital-intensive implementation of a front-end system for a radio device which is suitable for scalable CMOS technology.

This aim is achieved according to the disclosure with the front-end system for a radio device showing the characteristics of the first independent claim.

More in particular, according to embodiments of the present disclosure, the front-end system for a radio device comprises a charge generator circuit arranged for receiving a digital baseband signal and converting the digital baseband signal into at least one electrical charge. The charge generator circuit comprises a first converter circuit arranged for calculating at least one charge value based on the digital baseband signal and a second converter circuit arranged for converting the at least one charge value into at least one electrical charge. The front-end system comprises a modulator circuit arranged for generating a radio frequency signal based on the at least one electrical charge and at least one local oscillator signal. The first converter circuit is essentially a digital circuit and may comprise a processor unit. The first converter circuit calculates how much electrical charge would have to be provided by the second converter circuit so that the resulting radio frequency signal is an accurate representation of the baseband signal after modulation. The front-end system disclosed herein thus transfers an amount of electrical charge to the input of the modulation circuit directly in the charge-domain. Additionally, it avoids the need of linear (feedback-based) voltage amplifiers to drive the input of the modulation circuit.

According to one embodiment of the present disclosure, the second converter circuit is arranged for providing the at least one electrical charge to the modulator circuit via a charge reservoir comprising at least one capacitor. Sharing the electrical charge between the second converter circuit and the charge reservoir results in a smoothing function (i.e. a sin c2 transfer function) which attenuates the sampling aliases. In addition, the first converter circuit together with the charge reservoir introduces a first-order low-pass filter (LPF) in the signal path that further improves the transmitter out-of-band noise emission. The front-end system thus provides sufficient filtering to achieve the required out-of-band noise specifications.

According to one embodiment of the present disclosure, the second converter circuit is arranged for converting the at least one charge value into the at least one electrical charge by connecting at least one bank of switchable capacitors to the charge reservoir. The bank of switchable capacitors is first pre-charged to at least one pre-determined voltage and then connected to the charge reservoir. According to another embodiment of the present disclosure, the second converter circuit may be arranged for converting the at least one charge value into the at least one electrical charge by connecting at least one bank of switchable resistors between at least one pre-determined voltage and the charge reservoir for a pre-determined period of time. According to yet another embodiment of the present disclosure, the second converter circuit may be arranged for converting the at least one charge value into the at least one electrical charge by generating at least one current for a pre-determined period of time.

According to one embodiment of the present disclosure, the modulator circuit comprises at least one switch. The modulator circuit is arranged for generating a radio frequency signal by transferring the at least one electrical charge to an output load via at least one switch controlled by the at least one local oscillator signal. The modulation circuit thus transfers an amount of electrical charge, generated by the second converter circuit, to the output load. As a result, the transferred amount of charge on the output load defines a voltage signal which is the modulated representation of the digital baseband signal—the radio frequency signal.

According to another embodiment of the present disclosure, the output load comprises a capacitor.

According to some embodiments of the present disclosure, the digital baseband signal is a differential quadrature baseband signal. Accordingly, the modulator circuit may be arranged to receive four non-overlapping local oscillator signals.

According to some embodiments of the present disclosure, the front-end system for a radio device is provided with a control unit connected to the input of the modulator circuit and arranged to control the first converter circuit, so that the at least one charge value is calculated by taking into account the electrical charge available at the input of the modulator circuit. An analog-to-digital converter (ADC) may be arranged to convert the amount of charge at the input of the modulator circuit into a charge value. The control unit thus provides the first converter circuit with a charge value corresponding to the electrical charge available at the input of the modulator circuit. The first converter circuit takes into account the electrical charge already available at the input of the modulator circuit when determining the charge value for the next baseband sample. As a result, the charge value for the next baseband symbol represents the difference between the electrical charge available at the input of the modulator circuit and the electrical charge required for the next baseband sample. The second converter circuit thus generates the amount of electrical charge required to increase or decrease the electrical charge at the input of the modulator circuit. The control unit may be further arranged to control the first converter circuit so that the at least one charge value is calculated by taking into account inaccuracies in the front-end system due to manufacturing variabilities. In this case, the control unit is arranged to determine, for the current baseband sample, if there is an error between the charge value calculated by the first converter circuit and the actual amount of electrical charge present at the input of the modulator circuit. In case of an error, the control unit adjusts/corrects the first converter circuit so that the error is compensated.

According to some embodiments of the present disclosure method for a front-end system for a radio device, the method comprising the steps of receiving a digital baseband signal and calculating at least one charge value based on the digital baseband signal, converting the at least one charge value into at least one electrical charge, and generating a radio frequency signal based on the at least one electrical charge and the at least one local oscillator signal.

According to some embodiments the present disclosure relates as well to a radio device comprising a front-end system for a radio device according to the present disclosure and to a radio system comprising such radio device.

BRIEF DESCRIPTION OF THE FIGURES

For a better understanding of the present disclosure, some example embodiments are described below in conjunction with the appended figures and figures description, wherein.

DETAILED DESCRIPTION

Figure 1:
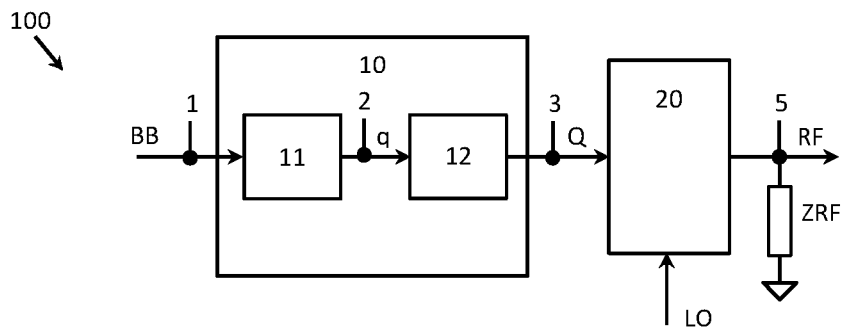
FIG. 1 illustrates a block diagram of a front-end system according to one embodiment of the present disclosure.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present disclosure, the only relevant components of the device are A and B.

Embodiments of the present disclosure will be explained with reference to the examples shown in FIG. 1 to FIG. 12.

FIG. 1 shows a front-end system for a radio device 100 which is arranged to convert a digital baseband signal BB to a radio frequency signal RF, wherein conversion is achieved by employing the principle of a charge transfer. The front-end system comprises a charge generator circuit 10 which is arranged for receiving a digital baseband signal BB and for converting that digital baseband signal BB into an electrical charge Q. The charge generator circuit 10 comprises a first converter circuit 11 and a second converter circuit 12. The first converter circuit 11 is arranged for calculating the necessary charge value q based on the digital baseband signal BB. The second converter circuit 12 is arranged for converting that charge value q into an electrical charge Q, thereby converting the charge value q, which is in fact a digital number—to an analog charge Q. The digital number is calculated such that the RF signal represents the digital baseband signal. The electrical charge Q is then transferred to an output load ZRF via a modulator circuit 20 in accordance with a local oscillator signal LO. As a result, the charge transferred to the output load ZRF defines the radio-frequency signal RF. The modulator circuit 20 thus generates a radio frequency signal RF based on said charge Q and the LO signal. The RF signal may be then fed to the antenna via a pre-amplifier and a power amplifier (not shown in the figures).

According to some embodiments, depending on the circuit connected to the output of the modulation circuit 20, the output load ZRF may be equivalent to a capacitive load, i.e. CRF. The output load ZRF would be equivalent to a capacitive load CRF in the example case where the modulator circuit 20 is connected to a pre-amplifier or a power amplifier.

Figure 2:
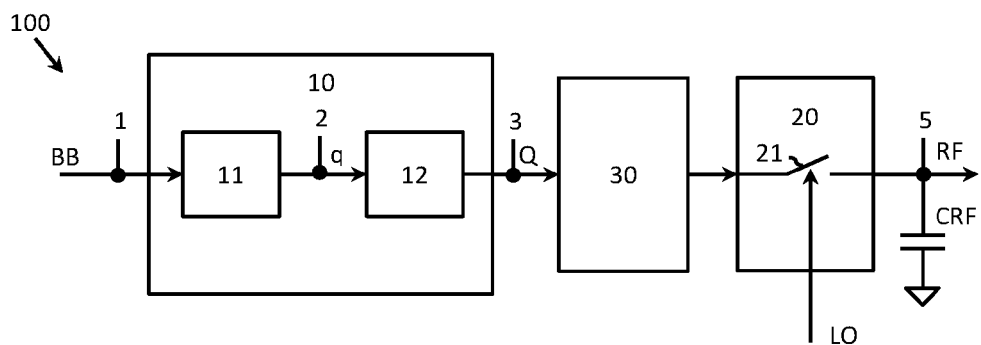
FIG. 2 illustrates a block diagram of a front-end system according to one embodiment of the present disclosure.
Figure 3:
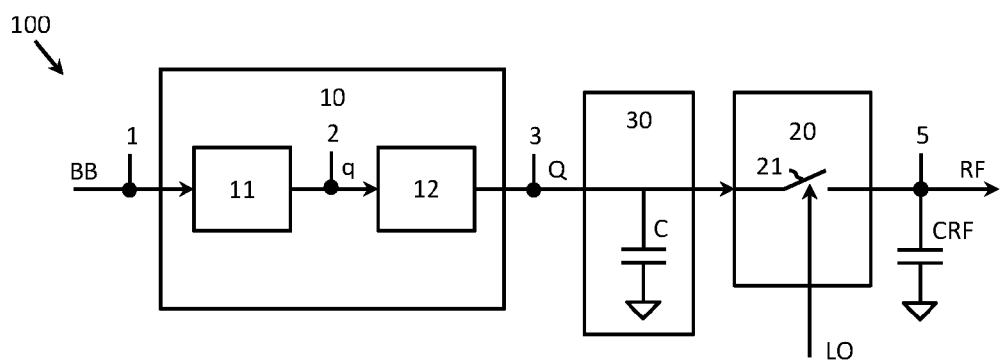
FIG. 3 illustrates a block diagram of a front-end system according to one embodiment of the present disclosure.

According to one embodiment, the front-end system 100 is provided with a charge reservoir 30 that comprises a capacitor C, connected between the second converter circuit 12 and the modulator circuit 20, as shown in FIG. 2 and FIG. 3. The charge reservoir 30 in combination with the second converter circuit 12 realizes a switched-capacitor resistor, which introduces an intrinsic first-order low-pass filter (LPF) in the signal path. As a result, the electrical charge Q is filtered before being fed to the input of the modulator circuit 20, which improves the out-of-band noise emission of the front-end system. The capacitor C may be larger, equal or smaller than the output capacitor CRF, i.e. the capacitance of C may be higher, equal or lower than the CRF's capacitance. For example, to provide sufficient out-of-band filtering, in a radio device operating in Frequency Division Duplex (FDD) mode and employing the front-end system according to the present disclosure, the capacitor C should be larger than the capacitor CRF. Further, depending on the specific out-of-band noise requirements, the capacitor C may be hundreds of times larger than the output capacitor CRF.

The front-end system 100 will be described in more details below with reference to a differential quadrature implementation.

Figure 4:
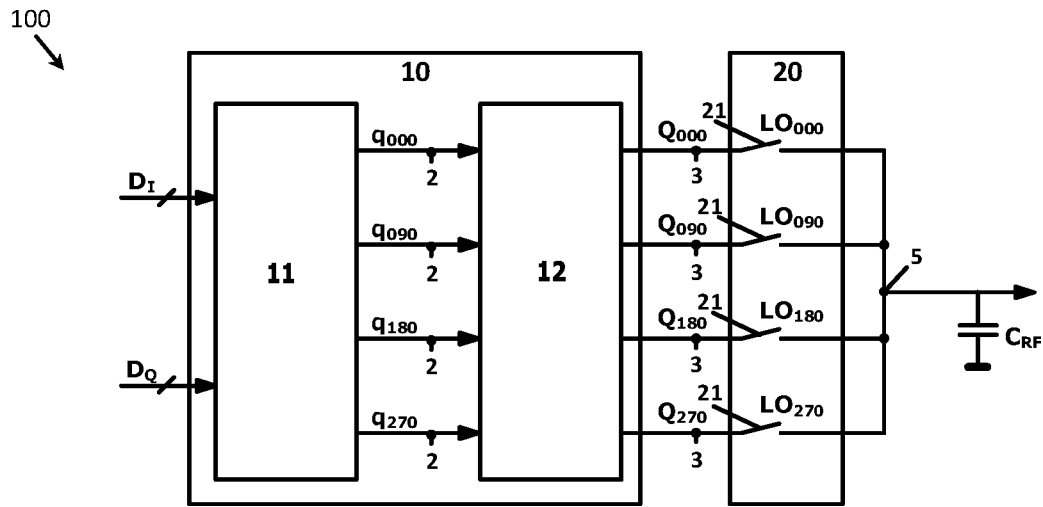
FIG. 4 illustrates a detailed block diagram of differential quadrature front-end system according to one embodiment of the present disclosure.

FIG. 4 shows a block diagram of a differential quadrature implementation of a front-end system for a radio device according to some embodiments. Differential quadrature digital baseband BB signals are received by the front-end system and respectively fed to the input of the first generator circuit 11. The first generator circuit 11 calculates a charge value $q_{NNN}$ for each corresponding baseband signal $BB_{NNN}$. The subscript NNN denotes the respective phase of each differential quadrature baseband signal. An alternative notation would be using multibit digital signals $D_I$, $D_Q$ representing the respective in-phase and quadrature signals. Four charge values (i.e. $q_{000}$, $q_{090}$, $q_{180}$, $q_{270}$) are thus calculated representing the each respective phase of the BB signal. The second converter circuit 12 then converts each charge value $q_{NNN}$ to an electrical charge $Q_{NNN}$ (i.e. $Q_{000}$, $Q_{090}$, $Q_{180}$, $Q_{270}$). In this implementation, the first converter circuit 11 has four output nodes 2, each providing a charge value $q_{NNN}$. The second converter circuit 12 is provided with four input nodes 2 arranged for receiving a charge values $q_{NNN}$ at each of its inputs and is provided with four output nodes 3 (herein also referred as baseband nodes) each arranged to provide an electrical charge $Q_{NNN}$. Similarly, the modulator circuit 20 is provided with a first set of four inputs arranged for receiving the four electrical charges $Q_{NNN}$ and a second set of four inputs arranged for receiving four non-overlapping LO signals (i.e. $LO_{000}$, $LO_{090}$, $LO_{180}$, $LO_{270}$), i.e. with four LO signals having a 25% duty cycle. The modulator circuit 20 comprises four switches 21 (or transistors arranged to act as switches) arranged to receive a respective LO signal at one of its terminals and a respective charge $Q_{NNN}$ at its other input terminal. Each switch 21 is thus switched ON or OFF based on the respective LO signal. As a result, the modulator circuit 20 effectively transfers the respective electrical charge $Q_{NNN}$ to the output capacitor CRF by connecting sequentially and according to the LO signals each respective baseband node 3 to the output capacitor CRF. The charge $Q_{NNN}$ transferred during each respective LO phase to the output capacitor CRF effectively moves the voltage at the output capacitor CRF (e.g. VRF) from one value to another. As the electrical charge $Q_{NNN}$ needed to charge the output capacitor CRF during the respective $LO_{NNN}$ phase corresponds to the charge value $q_{NNN}$, which in turn corresponds to the digital baseband signal, the voltage at the output capacitor CRF represents the modulated BB signal, i.e. the RF signal. The charge value $q_{NNN}$ needed can be calculates as follows:

$$q_{NNN} = (V_{BB,NNN} - V_{BB,NNN-90}) \times C_{RF} \quad (1)$$

According to one embodiment, the front-end system may be provided with a charge reservoir 30 which comprises four capacitors $C_{NNN}$ and connected between the second converter circuit 12 and the modulator circuit 20. In this case, charge value $q_{NNN}$ calculated by the first converter circuit 11 needs to include the amount of charge needed to charge or discharge the charge reservoir as well.

Figure 5:
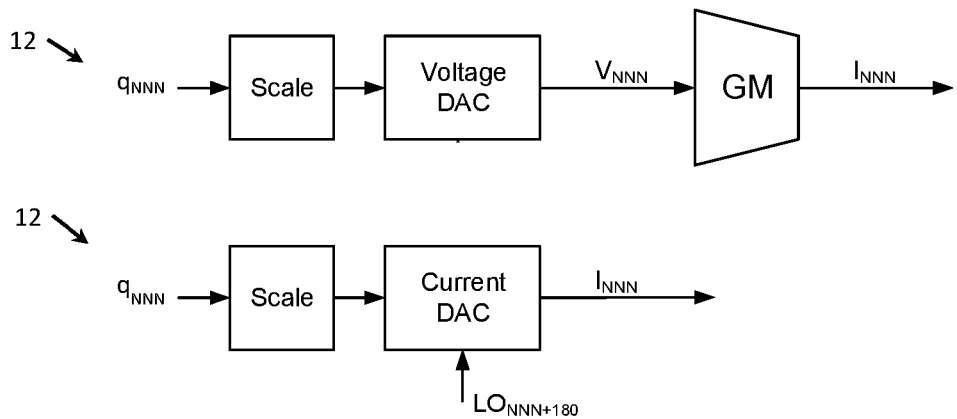
FIG. 5 illustrates example implementations of a second converter circuit according to some embodiments of the present disclosure.

According to one embodiment, the second converter circuit 12 may be arranged for converting the charge value $q_{NNN}$ into an electrical charge $Q_{NNN}$ by generating at least one current $I_{NNN}$ (i.e. $I_{000}$, $I_{090}$, $I_{180}$, $I_{270}$) for a pre-determined period of time. The second converter circuit may be for example implemented using current sources. Thus, by integrating the output of the current source during a certain period of time over a load, effectively an electrical charge Q is determined. FIG. 5 shows two example implementations of such converter circuit 12. In the top of the figure, a conventional DAC generating an output voltage signal $V_{NNN}$ followed by a transconductor GM is used. A digital scaling prior conversion may be required to set the correct overall gain, which takes into account the gains of each respective DAC and in addition the gain of the respective GM if needed. The bottom implementation of FIG. 5 uses a conventional DAC generating an output current signal $I_{NNN}$. Similarly, a digital scaling prior conversion may be required to set the correct overall gain by taking into account the gain of the respective current DAC. According to some embodiments, in order to limit the current flow, as the currents $I_{NNN}$ are integrated during the full period of each respective LO signals, including the period of time when the respective LO switch is closed, the output of the generator circuit 10 can be enabled only during a portion of the time when the respective LO switch 21 is open. For example, each current DAC may be enabled by the LO signal which is used to control the respective LO switch 21 but shifted by 180°. The generated current $I_{NNN}$ is thus first integrated over the respective capacitor $C_{NNN}$ of the charge reservoir 30, thereby creating an electrical charge $Q_{NNN}$ at the respective node 3 of the charge reservoir 30, and then transferred to the output load $C_{RF}$ via the respective LO switch 21 of the modulation circuit 20.

Figure 6:
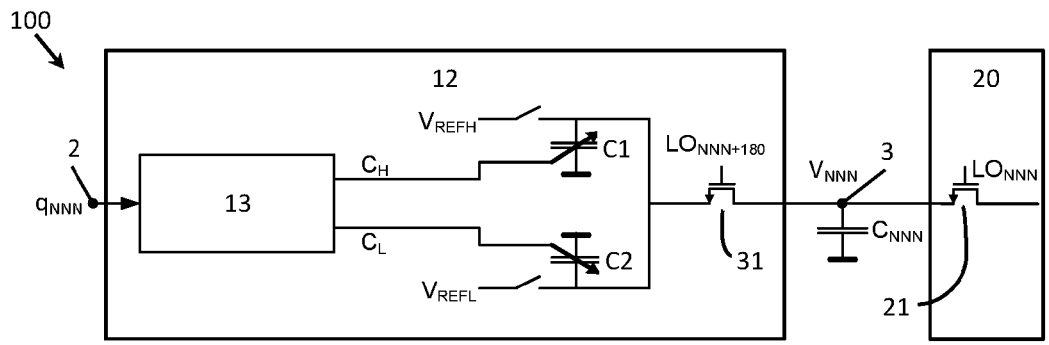
FIG. 6 illustrates an example implementation of a second converter circuit according to one embodiment of the present disclosure.
Figure 7:
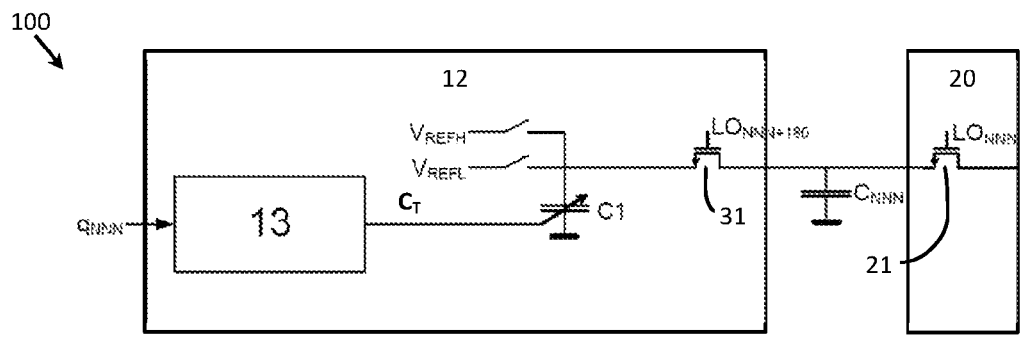
FIG. 7 illustrates an example implementation of a second converter circuit according to one embodiment of the present disclosure.

According to another embodiment, the second converter circuit 12 may be arranged for generating the required amount of electrical charge $Q_{NNN}$ by using two variable capacitors C1, C2 and capacitance calculation circuit 13, as shown in FIG. 6. The variable capacitors may be implemented as a bank of switchable unit capacitors $C_{UNIT}$. Alternatively, the variable capacitors may be realized with simple charge-based DACs, each consisting of a bank of switchable unit capacitors $C_{UNIT}$. The first bank of switchable unit capacitors (e.g. C1) is arranged to receive a first pre-determined voltage (e.g. $V_{REFH}$) and the second bank of switchable capacitors (e.g. C2) is arranged to receive a second pre-determined voltage (e.g. $V_{REFL}$). For example, the first voltage $V_{REFH}$ is higher than the second voltage $V_{REFL}$. The size of the variable capacitors (i.e. their respective capacitance) must be such that when the respective $LO_{NNN}$ switch 21 closes, the correct amount of electrical charge $Q_{NNN}$ is transferred to the output load $C_{RF}$. The electrical charge Q is first transferred to the charge reservoir 30 via an additional switch 31, provided between the output of circuit 12 and the charge reservoir 30, and then to the output load $C_{RF}$ via the modulation circuit 20. The capacitance calculating circuit 13 calculates digitally a capacitor value (i.e. $C_H$ and $C_L$) for each capacitor bank (i.e. C1 and C2) based on the charge value $q_{NNN}$. The capacitance of the variable capacitors C1, C2 is adjusted according to the calculated capacitor value (i.e. $C_H$ and $C_L$), for example, by switching ON or OFF the unit capacitors in the respective capacitor bank. If a positive charge value $q_{NNN}$ is to be delivered, the switchable capacitor bank C1 is pre-charged to the first (high) voltage $V_{REFH}$. Similarly, if a negative charge value $q_{NNN}$ is to be delivered, the capacitor bank C2 is pre-charged to the second (low) voltage $V_{REFL}$. Alternatively, as shown in FIG. 7, one variable capacitor C1 may be used instead of two. In this case, the charge calculator circuit 13 calculates a total capacitance value $C_T$. The capacitance of the capacitor bank C1 is adjusted according to the calculated capacitance value $C_T$ by switching ON or OFF the required number of unit capacitors. The capacitor bank C1 is then pre-charged either to the first or the second voltage in order to increase or decrease the electrical charge Q at the output load. As a result the voltage VRF at the output load is increased or decreased. In order to improve the overall power efficiency of the front-end system, the second converter circuit may be implemented using a multiple (more than two) variable capacitors each arranged to receive a different pre-determined voltage. Alternatively, it may be implemented using one variable capacitor arranged to receive multiple of pre-determined voltages.

Figure 8:
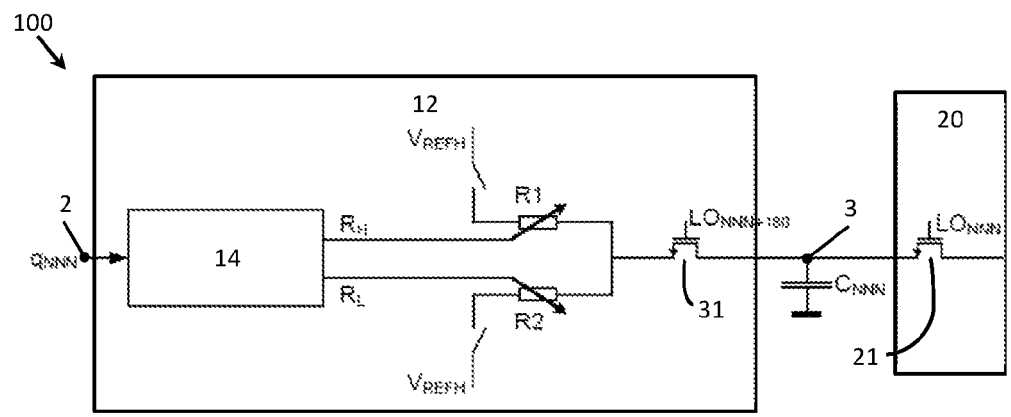
FIG. 8 illustrates an example implementation of a second converter circuit according to one embodiment of the present disclosure.
Figure 9:
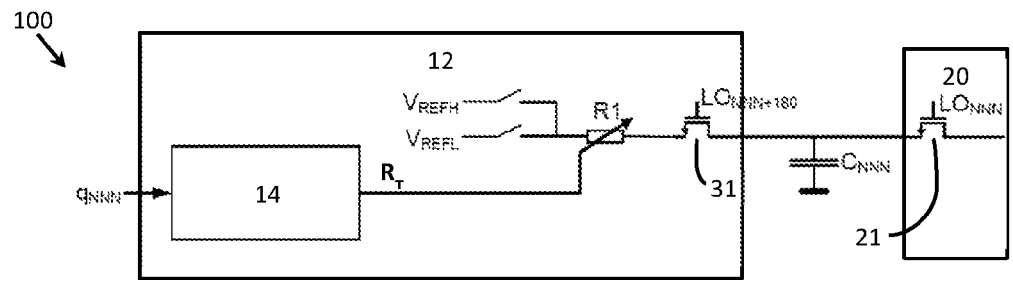
FIG. 9 illustrates an example implementation of a second converter circuit according to one embodiment of the present disclosure.

According to yet another embodiment, the converter circuit 12 may be arranged for converting the respective charge value $q_{NNN}$ into an electrical charge $Q_{NNN}$ by using two variable resistors R1, R2 and resistance calculation circuit 14, as shown in FIG. 8. Each variable resistor is connected between a pre-determined voltage ($V_{REFH}$, $V_{REFL}$) and the output load $C_{RF}$ for a pre-determined period of time. The required amount of electrical charge $Q_{NNN}$ is generated using the two variable resistors that control the current flowing to the output load. The variable resistors may be implemented as a bank of switchable unit resistors $R_{UNIT}$. The first bank of switchable unit resistors (e.g. R1) is arranged to receive a first pre-determined voltage (e.g. $V_{REFH}$) and the second bank of switchable resistors (e.g. R2) is arranged to receive a second pre-determined voltage (e.g. $V_{REFL}$). The first voltage $V_{REFH}$ is higher than the second voltage $V_{REFL}$. The size of the variable resistors (i.e. their respective resistance) must be such that when the respective LO switch 21 closes, the correct amount of electrical charge $Q_{NNN}$ is transferred to the output load $C_{RF}$. The electrical charge Q is first transferred to the charge reservoir 30 via an additional switch 31, provided between the output of circuit 12 and the charge reservoir 30, and then to the output load $C_{RF}$ via the modulation circuit 20. The resistance calculation circuit 14 calculates a resistance value (i.e. $R_H$ and $R_L$) for each resistor bank R1, R2 based on the charge value $q_{NNN}$. The resistance of the variable resistors R1, R2 is adjusted according to the calculated resistance value (i.e. $R_H$ and $R_L$), for example, by switching ON or OFF the unit resistors in the respective resistor bank. If a positive charge value $q_{NNN}$ is to be delivered, the switchable resistor bank R1 is connected to the first (high) voltage $V_{REFH}$. Similarly, if a negative charge value $q_{NNN}$ is to be delivered, the resistor bank R2 is connected to the second (low) voltage $V_{REFL}$. Alternatively, as shown in FIG. 9, one variable resistor R1 may be used instead of two. In this case, the resistance calculator circuit 14 calculates a total resistance value $R_T$. The resistance of the resistor bank R1 is adjusted according to the calculated value $R_T$ by switching ON or OFF the required number of unit resistors. The resistor bank R1 is then connected to the first or the second voltage ($V_{REFH}$ or $V_{REFL}$) and the charge reservoir capacitor $C_{NNN}$ or the output load $C_{RF}$, in order to increase or decrease the electrical charge Q at the output load. As a result the voltage VRF at the output load is increased or decreased. In order to improve the overall power efficiency of the front-end system, the second converter circuit may be implemented using a multiple (more than two) variable resistors each arranged to be connected between a different pre-determined voltage and the charge reservoir 30 for a pre-determined period of time. Alternatively, it may be implemented using one variable resistor arranged to be connected between a multiple (more than two) different pre-determined voltages and the charge reservoir.

According to one embodiment, the first converter circuit 11 is a digital circuit which may be realized using a processing unit. The first converter circuit 11 may be thus arranged to output a multi-bit digital signal representing the calculated charge value q. The multi-bit digital signal is then fed to the second converter circuit 12.

Figure 10:
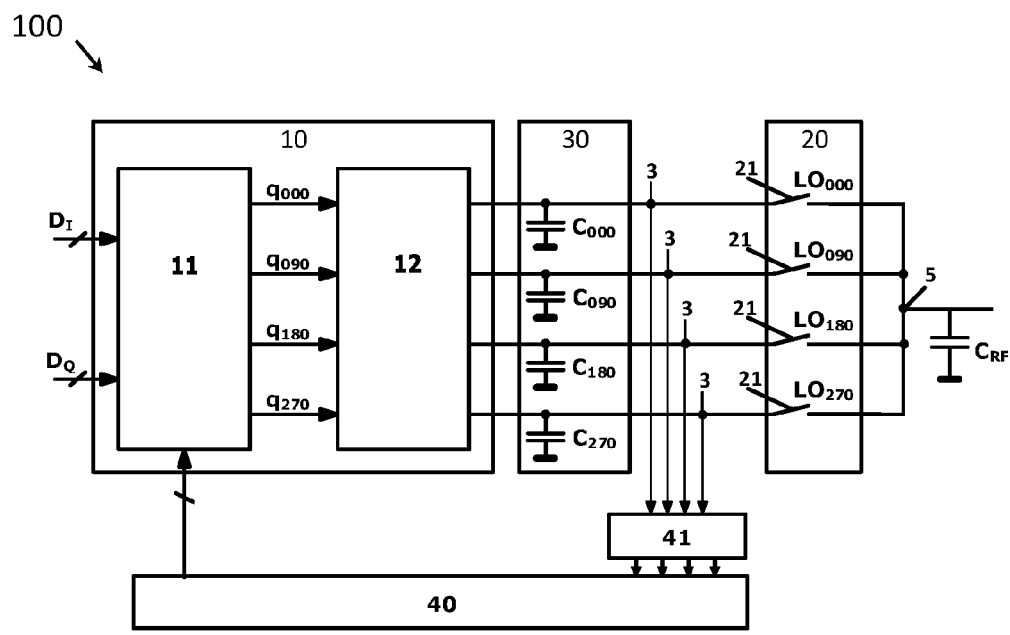
FIG. 10 illustrates a detailed block diagram of a differential quadrature front-end system according to one embodiment of the present disclosure.

According to one embodiment, the front-end system 100 may be provided with a control unit 40 connected between the input of the modulator circuit 20 and the first converter circuit 11, as shown in FIG. 10. The control unit is arranged to control the first converter circuit 11, so that the first converted circuit 11 calculates the charge value $q_{NNN}$ by taking into account the electrical charge $Q_{NNN}$ available at the input of the modulator circuit 20. The control unit is thus arranged to determine the amount of electrical charge $Q_{NNN}$ present at the respective baseband node 3, which may be converted to a digital value (i.e. $q_{NNN}$) by an analog-to-digital converter (ADC) 41. The ADC 41 may be provided between the control unit 40 and the input of the modulation circuit 20 and may be part of the control unit 40. The control unit 40 thus provides the first converter circuit 11 with a correction value so that circuit 11 takes into account the electrical charge already available at the input of the modulator circuit when determining the charge value $q_{NNN}$ for the next baseband sample. As a result, the charge value (i.e. $\Delta q_{NNN}$) for the next baseband symbol represents the difference between the electrical charge available at the input of the modulator circuit and the electrical charge required for the next baseband sample. In turn, the second converter circuit 12 generates the amount of electrical charge (i.e. $\Delta Q_{NNN}$) required to increase or decrease the electrical charge at the input of the modulator circuit.

According to another embodiment, the control unit 40 may be further arranged to control the first converter circuit 11 so that each charge value $q_{NNN}$ is calculated by taking into account inaccuracies in the front-end system due to manufacture variabilities. In this case, the control unit is arranged to determine, for the current baseband sample, the presence of an error between the charge value $q_{NNN}$ calculated by the first converter circuit 11 and the actual amount of electrical charge $Q_{NNN}$ present at the input of the modulator circuit 20. In case of an error, the control unit 40 adjusts/corrects the first converter circuit 11 so that the error is compensated.

Figure 11:
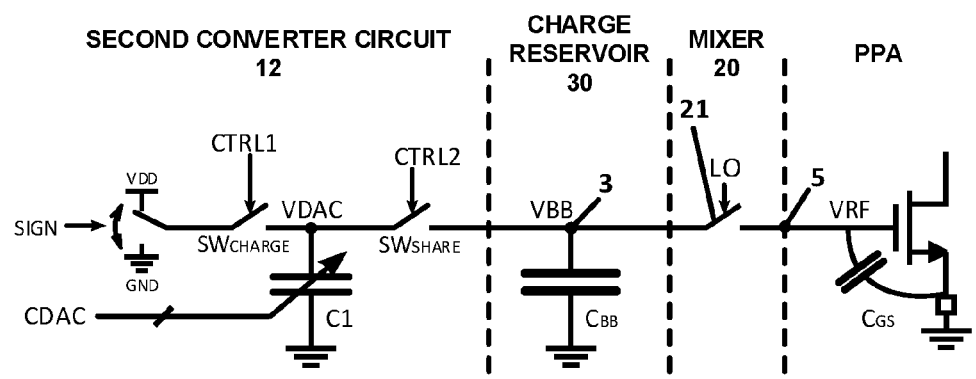
FIG. 11 illustrates a simplified schematic of a front-end system according to the present disclosure.
Figure 12:
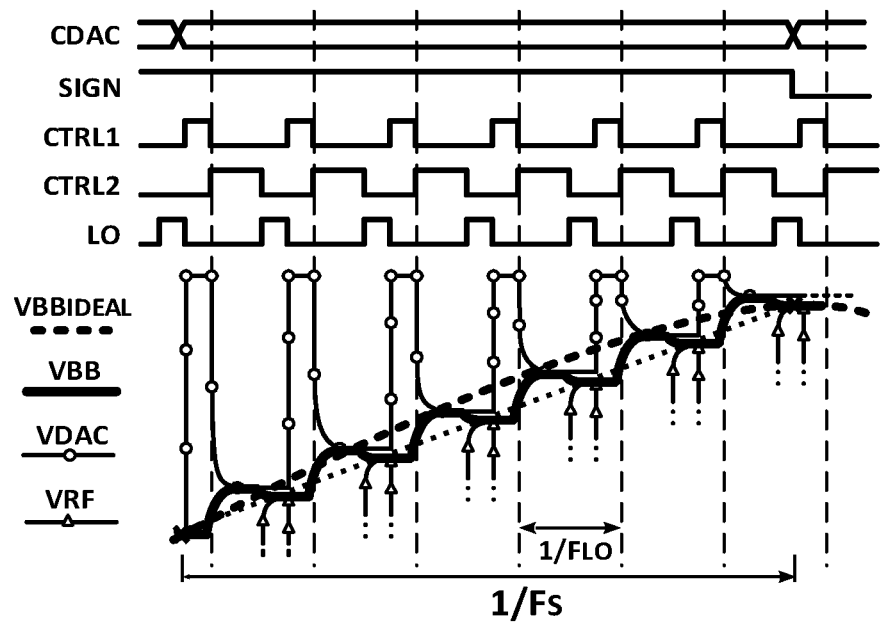
FIG. 12 illustrates a timing diagram of the operation of the front-end system of FIG. 11 according to the present disclosure.
Figure 12:
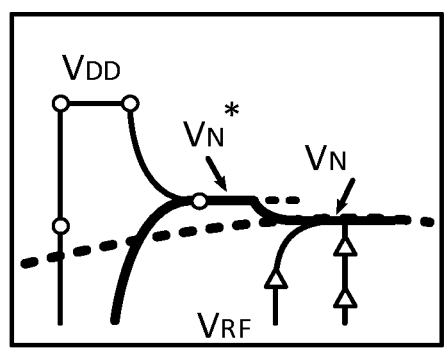

The method for a front-end system for a radio device will be explained with reference to FIG. 11 and FIG. 12. FIG. 11 shows a simplified schematic representation of the front-end system 100 using a second convert circuit 12 of FIG. 10. For simplicity, the first converter circuit 11 is not shown in the figure. Herein, the second converter circuit is represented with one bank of switchable capacitor C1 and two switches, i.e. a pre-charge switch (SWcharge) and a share switch (SWshare), each controlled by controls signal CTRL1 and CTRL2. In the illustration, the capacitance value of the variable capacitor C1 is controlled by the CDAC signal. The capacitor C1 is pre-charged either to a high or a low supply voltage (i.e. VDD or GND) whether the electrical charge Q at the output load (i.e. a pre-power amplifier (PPA) in this case) is to increased or decreased. The charge reservoir 30 is illustrated by a capacitor $C_{BB}$ and the modulation circuit 20 by an LO switch 21. FIG. 12 shows the respective timing diagrams of the control signals, i.e. CTRL1, CTRL2, the LO signal and the voltage signals at the output of the second converter circuit 12 (i.e. VDAC node), at the output of the charge reservoir 30 (i.e. at baseband node 3), at the output load (i.e. RF node 5), respectively. Although the method is described with reference to capacitive implementation of the converter circuit 12, the skilled person will recognize that the same method applies for the other alternative implementation.

According to some embodiments of the present disclosure, the voltages at the output node 5 (i.e. VRF) and at the baseband nodes 3 (i.e. VBB) are modified using digitally-controlled packets of electrical charge Q conveyed between one of the supply voltages (VDD or GND) and the RF node 5 through the charge reservoir capacitors (i.e. $C_{BB}$). For every baseband I/Q sample (i.e. BBI, BBQ), the first converter circuit 11 determines a charge value q, which corresponds to a capacitance value (e.g. $C_{DAC}$). If the variable capacitor C1 is realized using simple charge-based DACs, each consisting of a bank of switchable unit capacitors $C_{UNIT}$, the charge values q can be a multi-bit digital signal which may be directly used to control the DACs. The capacitance of the bank of switchable capacitors C1 is tuned in accordance to the capacitance value $C_{MAC}$, by switching ON or OFF a number of unit capacitors $C_{UNIT}$. After tuning the capacitance, the capacitor C1 is first pre-charged to either high or low supply voltage whether an increase or decrease of the voltage at the RF node5 is required, by switching switch SWcharge. Capacitor C1 is then connected to the charge reservoir capacitor $C_{BB}$, by switching switch SWshare, to deliver the correct amount of electrical charge Q corresponding to the charge value q to the inputs of the modulation circuit 20. The charge Q shared between these C1 and $C_{BB}$ capacitors brings the voltage VBB at node 3 to a voltage $V_N^*$ calculated to be such that when the modulator switch is closed, the RF node 5 settles at the desired voltage $V_N$, as shown in FIG. 12. The linear slope (shown as $VBB_{IDEAL}$) observed in the voltage $V_{BB}$ results in a sin $c^2$ transfer function that attenuates the sampling aliases. The two-phase operation (i.e. pre-charge and a share phase) of the capacitive DAC in combination with the charge reservoir capacitor $C_{BB}$ resembles a switched-capacitor resistor. This combination introduces an intrinsic first-order LPF in the signal path that improves the transmitter out-of-band noise emission. The charge Q is then transferred to the output node 5 via the LO switch 21 of the mixer 20. The total electrical charge needed (i.e. $Q_{TOTAL}$) for the operation of the front-end system 100 consists of two components: (i) the baseband electrical charge $Q_{BB}$ that allows the voltage on all charge reservoir capacitors $C_{BB}$ to follow the baseband I/Q samples; and (ii) the electrical charge $Q_{RF}$ at the RF node 5 needed to move the input voltage of the PPA at every quadrature LO cycle. That is, $Q_{TOTAL}=Q_{BB}+Q_{RF}$. This is realized with simple charge-based DACs (QDACs) 12, consisting of a bank of switchable unit capacitors $C_{UNIT}$ and baseband (filtering) capacitors $C_{BB}$. The electrical charge $Q_{BB}$ on the nodes 3 and $Q_{RF}$ on the RF node 5 can be calculated as $$Q_{BB}[k] = \Delta V_{BB} \cdot C_{BB} = (V_{BB}[k] - V_{BB}[k-1]) \cdot C_{BB} \qquad (2)$$

$$Q_{RF}[k] = \Delta V_{RF} \cdot C_{GS-PPA} = (V_{I/Q}[k] - V_{Q/I}[k]) \cdot C_{GS-PPA} \qquad (3)$$

The total electrical charge $Q_{TOTAL}$ is then $$Q_{TOTAL}[k] = Q_{BB}[k] + Q_{RF}[k] \qquad (4)$$

The capacitance $C_{DAC}$ that C1 needs to be tuned to so that C1 provides the required amount of charge Q is $$C_{DAC} = \frac{C_{BB}}{\frac{C_{BB}}{Q_{TOTAL}[k]}(V_{SUPPLY|VDD,GND} - V_{BB}[k-1]) - 1} \qquad (5)$$

In the disclosed front-end system, the smallest amount of charge Q conveyable from supply voltage VDD to node 3 and, thus, the quantization noise, is determined by the ratio $C_{UNIT}/C_{BB}$. By decreasing $C_{UNIT}$ with respect to $C_{BB}$, the effective number of bits (ENOB) can be increased without increasing the number of bits of the DACs in the first converter circuit 11. Herein, the number of bits defines the maximum amount of charge Q that can be transferred to the node 3 in a single LO period. Rather than signal-to-noise ratio (SNR), the number of bits determines the maximum product between amplitude and frequency that can be achieved in the DAC output. The front-end system provides a better quantization noise performance when compared to a conventional DAC with the same number of bits.

According to the present disclosure, instead of sampling the value of the baseband voltage at the input of the modulator circuit as in conventional radio architectures, the front-end system for a radio device transfers an amount of electrical charge to the input of the modulator circuit directly in charge-domain. The transferred electrical charge is essentially equivalent to the voltage at the input of the modulation circuit (voltage-sampling mixer) in conventional radio architectures. In an example embodiment, the front-end system may operate with the minimum amount of electrical charge theoretically needed to provide the required voltage swings at the output load. In addition, it avoids the need of linear (feedback-based) voltage amplifiers to drive the input of the modulation circuit. The front-end system provides sufficient in-band signal accuracy as well as sufficient filtering to achieve the required out-of-band noise specifications. Furthermore, it benefits from technology scaling as it is mainly composed of transistors (acting as switches) and capacitors.

What is claimed is:

1. A front-end system for a radio device comprising:
a charge generator circuit arranged for receiving a digital baseband signal, and comprising a first converter circuit arranged for calculating at least one charge value based on the digital baseband signal, wherein the at least one charge value comprises a digital number, and a second converter circuit arranged for converting the at least one charge value into at least one electrical charge, and
a modulator circuit arranged for generating a radio frequency signal based on the at least one electrical charge and at least one local oscillator signal.

2. The front-end system for a radio device according to claim 1, further comprising a charge reservoir connected between the second converter circuit and the modulator circuit, and wherein the charge reservoir comprises at least one capacitor.

3. The front-end system for a radio device according to claim 2, wherein the second converter circuit is arranged for converting the at least one charge value into the at least one electrical charge by connecting at least one bank of switchable capacitors to the charge reservoir, the at least one bank of switchable capacitors being pre-charged to at least one pre-determined voltage.

4. The front-end system for a radio device according to claim 2, wherein the second converter circuit is arranged for converting the at least one charge value into the at least one electrical charge by connecting, for a predetermined period of time, at least one bank of switchable resistors between at least one pre-determined reference voltage and the charge reservoir.

5. The front-end system for a radio device according to claim 1, wherein the second converter circuit is arranged for converting the at least one charge value into the at least one electrical charge by generating at least one current for a pre-determined period of time.

6. The front-end system for a radio device according to claim 1, wherein the modulator circuit comprises at least one switch, and is arranged for generating a radio frequency signal by transferring the at least one electrical charge to an output load via the at least one switch controlled by the at least one local oscillator signal.

7. The front-end system for a radio device according to claim 6, wherein the output load comprises a capacitor.

8. The front-end system for a radio device according to claim 1, wherein the digital baseband signal is a differential quadrature baseband signal.

9. The front-end system for a radio device according to claim 1, where the modulator circuit receives four non-overlapping local oscillator signals, and is arranged for generating the radio frequency signal based on the at least one electrical charge and the four non-overlapping local oscillator signals.

10. The front-end system for a radio device according to claim 1, further comprising a control unit connected to an input of the modulator circuit, and arranged to control the first converter circuit so that the at least one charge value is calculated by taking into account the electrical charge available at the input of the modulator circuit.

11. A radio network comprising the front-end system for the radio device.

12. A radio network system comprising the radio device according to claim 11.

13. A method for operating a front-end system for a radio device, the method comprising:
receiving, by a first converter circuit, a digital baseband signal;
calculating, by the first converter circuit, at least one charge value based on the digital baseband signal, wherein the at least one charge value comprises a digital number;
converting, by a second converter circuit, the at least one charge value into at least one electrical charge;
filtering, by a switched-capacitor resistor comprising a charge-reservoir capacitor and the second converter circuit to improve out-of-band noise emission, the at least one electrical charge; and generating, by a modulator circuit, a radio frequency signal based on the at least one electrical charge and at least one local oscillator signal.

\* \* \* \* \*